United States Patent

[11] 3,610,707

| [72] | Inventors | Kyozo Kondo<br>Tokyo;<br>Morio Uchimura, Tokyo; Kenichi Kojima, Omiya; Yoshio Nomura, Tokyo, all of Japan |
|------|-----------|---|
| [21] | Appl. No. | 7,034 |
| [22] | Filed | Jan. 30, 1970 |
| [45] | Patented | Oct. 5, 1971 |
| [73] | Assignee | Nippon Kokuyu Tetsudo<br>Tokyo-to, Japan |
| [32] | Priority | Apr. 9, 1969, Apr. 9, 1969 |
| [33] | | Japan |
| [31] | | 44/26841 and 44/26842 |

[54] BRAKE CONTROL SYSTEM
4 Claims, 3 Drawing Figs.

[52] U.S. Cl. .................................................. 303/70,
    303/30, 303/35, 303/36
[51] Int. Cl. .................................................. B60t 15/50
[50] Field of Search .................................. 303/30, 35, 36, 70

[56] References Cited
UNITED STATES PATENTS

| 1,956,674 | 5/1934 | Farmer | 303/70 |
| 2,032,143 | 2/1936 | McCune | 303/70 X |
| 2,444,993 | 7/1948 | Klein | 303/70 |
| 2,789,020 | 4/1957 | Jados | 303/70 |

FOREIGN PATENTS

| 1,210,452 | 2/1966 | Germany | 303/70 |
| 902,858 | 8/1962 | Great Britain | 303/70 |
| 979,254 | 1/1965 | Great Britain | 303/70 |

*Primary Examiner*—Milton Buchler
*Assistant Examiner*—Stephen G. Kunin
*Attorneys*—Robert E. Burns and Emmanuel J. Lobato

ABSTRACT: A pnuematic brake control system of the so-called three-pressure type installed in each of several cars in a train as a unit system of a continuous brake system and including a first expansion air reservoir and a constant-pressure air reservoir, the unit system further having a second expansion air reservoir connected by a path to the constant-pressure air reservoir and a valve operable by pressurized air from the first expansion air reservoir to open the path thereby to permit air within the constant-pressure air reservoir to enter into the second expansion air reservoir.

— 1 —

BRAKE CONTROL SYSTEM

BACKGROUND OF THE INVENTION

This invention relates generally to pneumatic actuation systems and to vehicles and braking systems thereof.

More particularly, the invention relates to improvements in and relating to pneumatic brake control systems of the so-called automatic three-pressure type provided in each car of a train comprising a number of cars, wagons, or carriages coupled in series, principally of the kind used on railways, and operating in response to pneumatic control commands transmitted through a common brake line from a driver's cab to the brake control system units in all cars. These units, in combination, constitute an automatic continuous brake system for carrying out simultaneous and coordinated braking of all cars in the train. Brake control systems of this character known heretofore have been accompanied by various difficulties as will be described fully hereinafter. While much improvement has been effected in these known systems, a number of difficulties still exist as described also hereinafter.

SUMMARY OF THE INVENTION

It is an object of the present invention to overcome the difficulties accompanying known brake control systems mentioned above and described more fully hereinafter.

More specifically, an object of the invention is to provide a brake control system of the class referred to above in which the need for limiting the degree of an abrupt braking action, described hereinafter, is eliminated, the effective action of the abrupt braking is improved without adverse effects, and the speed at which the start of braking action is transmitted to all cars in a train is increased.

Another object of the invention is to prevent defective brake release action.

Still another object of the invention is to provide, in the instant brake control system, means whereby emergency braking operation is prevented even during a rapid decrease in the brake line pressure due to abrupt braking action during the initial period of normal braking.

According to the present invention, briefly summarized, there is provided a pneumatic brake control system of the three-pressure type described fully hereinafter which has a first expansion air reservoir and a constant-pressure air reservoir and, moreover, has a second expansion air reservoir connected by a path to the constant-pressure air reservoir and a valve operable by pressurized air from the first expansion air reservoir to open the path thereby to permit air within the constant-pressure air reservoir to enter into the second expansion air reservoir.

The nature, principle, details, and utility of the invention will be more clearly apparent from the following detailed description when read in conjunction with the accompanying drawings, in which like parts are designated by like reference numerals.

DETAILED DESCRIPTION

Figure 1:
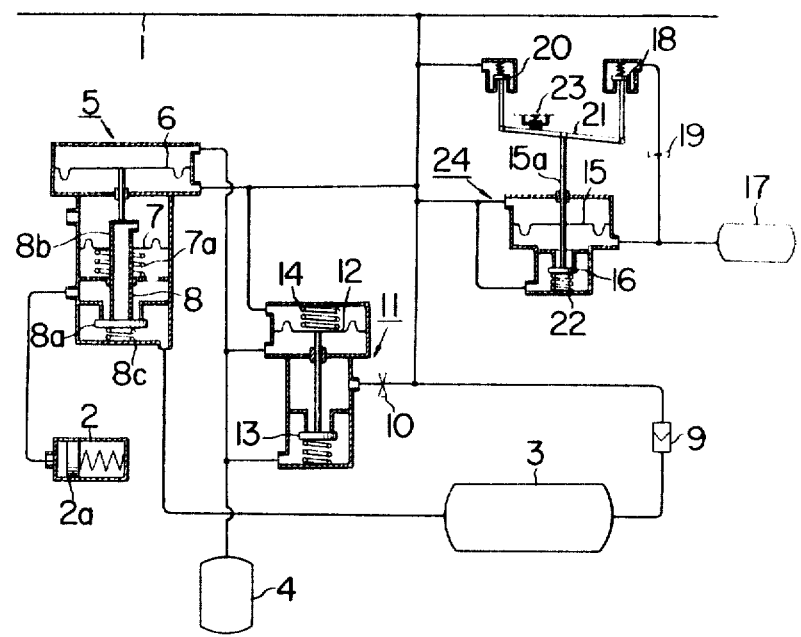
FIG. 1 is a schematic diagram showing the pneumatic circuit of a three-pressure type brake control system in the prior art and presented for an explanation of the principle thereof.

Referring first to FIG. 1, there is shown a known brake control system of three-pressure type provided in each car of a train comprising a large number of cars or carriages coupled in series, principally of the kind used on railways, and operating in response to control commands from the driver's cab. This brake control system constitutes one unit in an automatic continuous brake system for carrying out simultaneous and coordinated braking of all cars in the train.

Braking commands are received by the system unit by way of continuously coupled brake line 1 originating from the driver's cab and passing through all cars. The system unit thereupon operates to control the air pressure supplied to the brake cylinders of the car represented in FIG. 1 by a single brake cylinder 2 thereby to move the piston 2a provided in each cylinder, whereby a brakeshoe (not shown) coupled to the piston 2a is actuated with respect to the corresponding wheel.

The brake cylinder 2 is supplied with pressurized air stored in a supply air reservoir 3. A constant-pressure air reservoir 4 is provided for memorizing the air pressure within the brake line 1 when the brake system is in a state wherein the wheels are not being braked (hereinafter referred to as "running state"). A three-pressure type brake control valve 5 is connected between the brake cylinder 2 and the brake line 1, supply air reservoir 3, and the constant-pressure air reservoir 4 and operates to compare the pressures of the brake line 1 and of the constant-pressure air reservoir 4 and control the pressure of the brake cylinder 2 in accordance with the result of this comparison.

The essential parts of the brake control valve 5 are a main diaphragm 6 receiving the pressure of the constant-pressure air reservoir 4 on its upper side and the pressure of the brake line 1 on its lower side, an auxiliary diaphragm 7 receiving atmospheric pressure on its upper side and the pressure of the brake cylinder 2 on its lower side, a supply-discharge valve mechanism 8 including a partly hollow stem 8b coupling the main and auxiliary diaphragms 6 and 7, a disk valve 8a, and necessary springs 7a and 8c, the valve mechanism 8 being operated by the diaphragms 6 and 7 to supply pressurized air from the supply air reservoir 3 to the brake cylinder 2 and to exhaust pressurized air within the brake cylinder 2 to the atmosphere. Directions such as "upper" and "lower " as herein used correspond to those as viewed in the drawings but are not necessarily those of the mechanical parts in actual installation.

The supply air reservoir 3 has an inlet connected to the brake line 1 by an inlet line in which a check valve 9 is installed to prevent reverse flow of air from the reservoir 3 to the brake line 1. A choke valve 10 and a second valve 11 are connected in series between the brake line 1 and the line between the constant-pressure air reservoir 4 and the brake control valve 5.

The second valve 11 comprises a diaphragm 12 receiving the pressure of the brake line 1 on its upper side and the pressure of the constant-pressure air reservoir 4 on its lower side, a cutoff valve 13 connected to the lower surface of the diaphragm 12 by a connecting rod, and a compression spring 14 disposed above the diaphragm 12 and applying thereon a downward force whereby the cutoff valve 13 is maintained open while the brake system is in the aforedefined running state, and a communicative path is thus maintained between the brake line 1 and the reservoir 4. Accordingly, a decrease in the pressure of the brake line 1 results in a shutting off the path between the brake line 1 and the reservoir 4.

In addition, there is provided a quick-action device comprising an expansion air reservoir or quick-action chamber 17, a differential-pressure valve 24 interposed between the chamber 17 and the brake line 1, and a lever and valve mechanism. The differential-pressure valve 24 has a diaphragm 15 receiving on its lower side the air pressure within the quick-action chamber 17 and on its upper side the pressure of the brake line 1.

The diaphragm 15 is connected to a connecting rod 15a which is connected at its lower end to a cutoff valve 16 for opening and closing the path of pressurized air supply to the quick-action chamber 17 and at its upper end to a lever 21 at a point thereof intermediate between its ends. One end of the lever 21 is linked to operate an exhaust valve 18 for slowly exhausting pressurized air from the quick-action chamber 17 by way of a choke valve 19. The other end of the lever 21 is linked to operate an emergency valve 20 for quickly exhausting pressurized air within the brake line 1 to the atmosphere.

When a number of vehicles provided with brake control systems each of the above-described organization are coupled together to form a train with a common brake line 1 extending continuously from the reading driver's cab to the rearmost car, each brake control system can be operated in the following manner.

First, pressurized air at a constant pressure (5 kg./cm.$^2$, gauge, in many cases for railway cars) is supplied into the brake line 1 from driver's cab. Thereupon, in the brake control system of each car, constant-pressure reservoir 4 is charged with pressurized air through choke valve 10 and cutoff valve 13 (since valve 13 is held open by spring 14) to the same pressure as brake line 1, and supply air reservoir 3 is charged with air through check valve 9 to substantially the same pressure as brake line 1. Furthermore, quick-action chamber 17 is charged with air through cutoff valve 16 to the same pressure as brake line 1.

Since the pressure in brake line 1 and the pressure within constant-pressure reservoir 4 are equal in this case, the pressures on opposite sides of main diaphragm 6 within control valve 5 are in equilibrium, and supply-discharge valve 8 assumes its air discharge state, the lower end of partly hollow stem 8$b$ being separated from the upper surface of disk valve 8$a$ by the force of spring 7$a$. At the same time, disk valve 8$a$ is closed to shut off pressurized air supplied from supply air reservoir 3, and brake cylinder 2 is in communicate state relative to the atmosphere, whereby it is inoperative. This is the aforementioned running state.

When the brakes of the train are to be applied, brake line 1 is opened at the driver's cab to the atmosphere to reduced, the brake line pressure. Then, in the brake control system of each car, the pressurized air in constant-pressure air reservoir 4 first flows temporarily in reverse through cutoff valve 13 and choke valve 10 toward brake line 1. However, since the pressure of brake line 1 drops at a sufficiently high rate, it soon becomes lower than the pressure in constant-pressure air reservoir 4, and, consequently, diaphragm 12 is deflected upward, overcoming the force of spring 14, to close cutoff valve 13. Thereafter, the pressure in constant-pressure reservoir 4 is maintained constant (at a value substantially the same as the pressure of brake line 1 when the system is in the running state).

A differential pressure substantially equal to the pressure drop in brake line 1 thus develops on the opposite sides of main diaphragm 6 of control valve 5. Consequently, stem 8$b$ of supply-discharge valve 8 is forced downward counter to the force of spring 7$a$ below auxiliary diaphragm 7, whereby the lower end of stem 8$b$ contacts disk valve 8$a$ to close the exhaust path of brake cylinder 2. At the same time, stem 8$b$ forces disk valve 8$a$ to open thereby to permit pressurized air in supply air reservoir 3 to enter brake cylinder 2.

When disk valve 8$a$ is thus opened, the same pressure as that of brake cylinder 2 acts upward also on auxiliary diaphragm 7, imparting an upward force thereto, and when the pressure within brake cylinder 2 reaches a certain value, a state of equilibrium is attained between this upward force and the above-mentioned downward force on main diaphragm 6. Accordingly, supply-discharge valve 8 assumes a state wherein both the path between supply air reservoir 3 and brake cylinder 2 and the air exhaust path from brake cylinder 2 to the atmosphere are closed, whereby the pressure in brake cylinder 2 is maintained constant.

Control valve 5 of three-pressure type thus produces a brake cylinder pressure, that is, a braking effect, which is substantially proportional to the pressure drop in brake line 1.

On one hand, since the pressure within quick-action chamber 17 of the quick-action device is maintained unchanged when the pressure of brake line 1 is reduced diaphragm 15 of differential-pressure valve 24 is raised upward, whereby rod 15$a$ operates through lever 21 to first open exhaust valve 18, and pressurized air in quick-action chamber 17 is exhausted through choke valve 19, whereupon the pressure within quick-action chamber 17 decreases at a constant rate.

When, in comparison with this rate of pressure decrease, the rate of pressure drop in brake line 1 is greater, the differential pressure between quick-action chamber 17 and brake line 1 increases even more with time until, ultimately, it overcomes the force of a spring 23 to open emergency valve 20, which has a large aperture. Consequently, the pressurized air of brake line 1 is exhausted abruptly through the large aperture of emergency valve 20, and the pressure within brake line 1 instantly drops to atmospheric pressure.

Thus, the quick-action device accomplishes the operation of discriminately detecting the rate of pressure drop in brake line 1, judging, that an emergency braking command has been issued when the rate of this pressure drop is higher than that for normal braking, and taking the initiative action of releasing the pressure in brake line 1 to the atmosphere thereby to propagate and transmit the condition of emergency braking through brake line 1 to the succeeding cars.

While one example of the conventional automatic continuous brake system has an organization and operation based on the above described principle, the system in the form described above has the following serious disadvantage. When, with the intention of applying the brakes, the pressurized air within brake line 1 is released at the driver's cab, the reduction in pressure in brake line 1 occurs promptly and, moreover, at an amply high rate in the forward cars near the driver's cab, but in the rear cars, thus pressure reduction is relatively delayed and, moreover, occurs at a lower rate.

For this reason, not only is the time of effective braking in the rear cars delayed, but the development of the differential pressure required for closing the path between constant-pressure air reservoir 4 and brake line 1 is retarded, and, in the meantime, the reverse flow of air from constant-pressure air reservoir 4 to brake line continues through cutoff valve 13 and choke valve 10. Then, since the rate of pressure drop of constant-pressure air reservoir 4 is high, the above mentioned differential pressure remains low in the rear cars even after the pressure in brake line 1 assumes a constant value throughout the entire train after the elapse of time. Consequently, the pressures in brake cylinders 2 in the rear cars are low and insufficient for uniform braking.

This difficulty is ordinarily overcome by an organization of the brake control system whereby, in the initial period of each braking procedure, an operation (abrupt braking) wherein the reduction of pressure in the brake line 1 is propagated and transmitted from the forward cars to the rear cars is accomplished.

Figure 2:
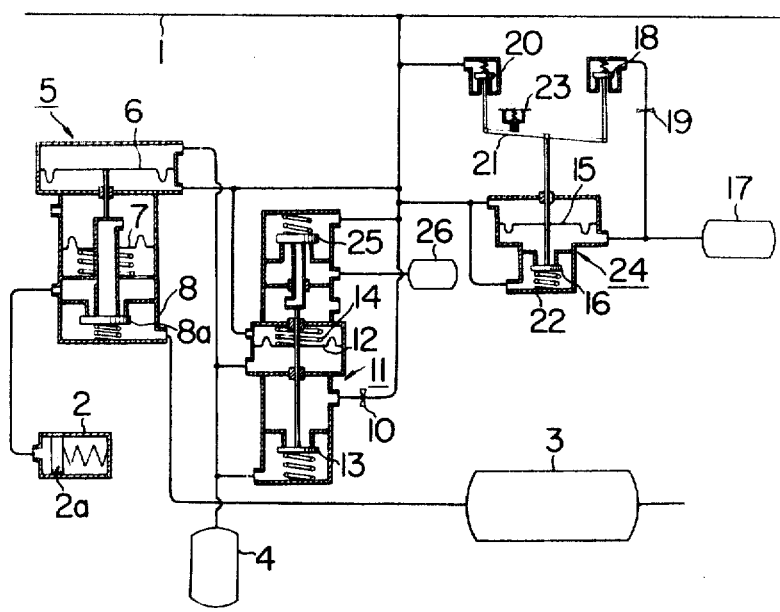
FIG. 2 is a schematic diagram of the pneumatic circuit of an improved three-pressure type brake control system in the prior art.

In one example of such an organization as illustrated in FIG. 2, the parts designated by reference numerals 1 through 24 and their arrangement are the same as those similarly designated in the control system illustrated in FIG. 1. The system shown in FIG. 2 differs in that there are further provided a supply-discharge valve 25 which is vertically movable together with the diaphragm 12 of the valve 11 and an expansion air reservoir 26 communicable with the brake line 1 by way of the supply-discharge valve 25.

When the brake system is in the aforementioned running state, diaphragm 12 is in its downwardly depressed state because of the force of spring 14 as mentioned hereinbefore. Consequently, supply-discharge valve 25 is closing the path between brake line 1 and expansion air reservoir 26 as indicated FIG. 1, and reservoir 26 is in communication with the atmosphere.

When the pressurized air in brake line 1 is exhausted at the driver's cab, the resulting reduction of pressure in brake line 1 is first detected promptly by the brake control system in the car closest to the driver's cab, and diaphragm 12 in that control system is moved upward. Thereupon, as described hereinbefore, the path between constant-pressure air reservoir 4 and brake line 1 is shut off by shutoff valve 13, and, at the same time, the communicative path of expansion air reservoir 26 is changed over from the atmosphere to brake line 1.

As a result, the pressurized air within brake line 1 in the initial braking stage, which air is at a pressure substantially equal to the pressure in the running state, is introduced into expansion air reservoir 26 initially at atmospheric pressure, and the pressure in brake line 1 drops abruptly by a certain amount determined by the volumetric ratio of reservoir 26 and brake line 1.

This abrupt drop in the brake line pressure, i.e., so-called abrupt braking, is transmitted through brake line 1 as a pressure wave within the brake line to the succeeding cars, and the same abrupt braking is induced in the succeeding cars, whereby the constant-pressure reservoirs 4 are shut off promptly from brake line 1 in all cars, even in the rearmost car. At the same time, a specific magnitude of pressure reduction in the brake line is secured, and the start of supplying of air from supply air reservoir 3 to brake cylinder 2 in the control system of each car is promoted, the time instant at which the brakes of the rear cars take effect being thereby advanced. Moreover, the brake cylinder pressure in the rear cars is maintained the same as that in the forward cars. By this abrupt braking operation, the speed of transmission of the braking action relating to the start thereof from the driver's cab to the rear cars is substantially increased.

To attain this increase in speed of transmission of abrupt braking action, it is necessary to effect measures such as selecting valves 11 of very sensitive character which will operate in response to extremely minute pressure differences and constructing the valve 25 between the brake line 1 and the expansion air reservoir 26 with low passageway resistance. While such measures are important, it is more important to select an expansion air reservoir of a volumetric capacity greater than the brake line capacity and thereby to obtain a large drop in the brake line pressure due to abrupt braking action.

However, if the pressure drop is caused to be excessively large, the aforedescribed quick-action device will operate in the initial period of normal braking and inconveniently cause emergency braking operation. Furthermore, when a very small reduction in the brake line pressure is carried out at the driver's cab to apply a very light braking action, a braking action which is stronger than that intended is applied by the abrupt braking operation in all cars. Accordingly, it is unavoidably necessary to limit the increase in this abrupt braking action.

As mentioned hereinbefore, the present invention contemplates the elimination of this limitation, an improvement of the affective action of the abrupt braking without cause for anxiety, and an increase in the speed at which the start of braking operation is transmitted.

Figure 3:
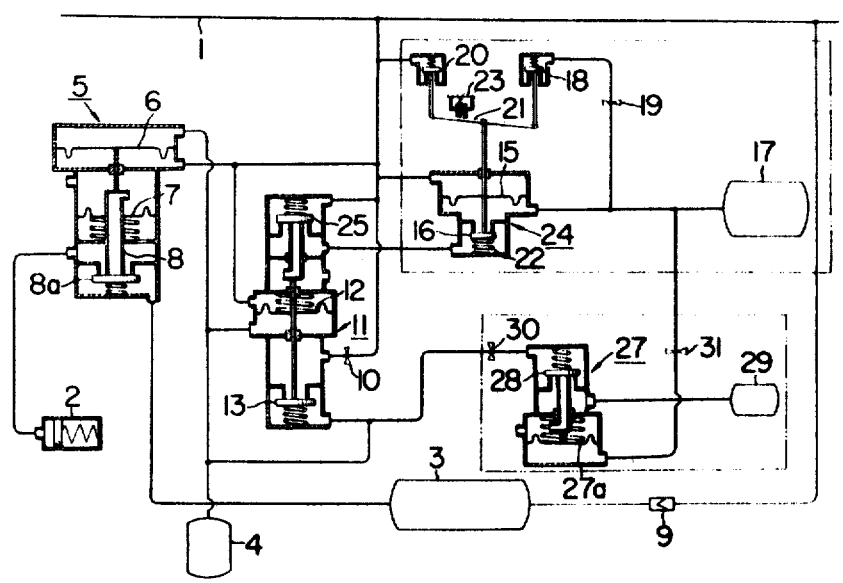
FIG. 3 is a schematic diagram showing the essential components in the pneumatic circuit of one example of a three-pressure type brake control system according to the invention.

In a preferred embodiment of the invention for achieving this object, as illustrated in FIG. 3, the parts designated by reference numerals 1 through 25 are identical to those of the same designation in the previously described system. This control system shown in FIG. 3 differs from the previously described system in that the constant-pressure air reservoir 4 and a second expansion air reservoir 29 are connected by way of a valve 27 operable by the pressurized air in the aforedescribed quick-action chamber, and the valve 24 is provided in an air path between the valve 25 and the quick-action chamber 17.

When the system is in the running state, the pressure in the quick-action chamber 17 is atmospheric pressure as mentioned hereinbefore. Accordingly, diaphragm 27a within valve 27 is in its lower position because of the force of a spring thereabove, and valve 28 operable by diaphragm 27a is in its air exhaust position, whereby expansion air reservoir 29 is shut off from constant-pressure air reservoir 4 and is communicating with the atmosphere. Furthermore, since quick-action chamber 17 is at atmospheric pressure, diaphragm 15 in valve 24 also is depressed downward by the brake line pressure thereabove, whereby valve 16 is fully open.

When the pressure in brake line 1 is reduced for applying braking action, the pressurized air in brake line 1 passes by valve 25 and, passing by fully open valve 16, enters quick-action chamber 17, whereby an abrupt drop in the pressure of brake line 1 is obtained, as described hereinbefore. By this action, the abrupt braking at the initial stage of the braking action is accomplished. Since the pressurized air of brake line 1 is not fully charged into quick-action chamber 17 until this abrupt braking action is completed, quick-action operation for transmitting emergency braking action does not occur until the initial abrupt braking is completed.

When quick-action chamber 17 has been charged to a pressure substantially equal to that of brake line 1, the resulting pressurized air is introduced, with a slight delay due to the effect of a choke valve 31, to the lower side of diaphragm 27a of valve 27 to raise this diaphragm. Accordingly, the path from expansion air reservoir 29 to the atmosphere is shut off and simultaneously changed over to a path communicating reservoir 29 to constant-pressure air reservoir 4 through a choke valve 30.

The pressure within constant-pressure reservoir 4, which has been maintained almost equal to the brake line pressure in the running state is thereafter determined because of the initial abrupt braking action by the ratio of the volumetric capacities of constant-pressure air reservoir 4 and expansion air reservoir 29. Even in the case when the pressure is lowered by a specific value, and the abrupt drop in the brake line pressure due to the abrupt braking action is large, it is possible to prevent disadvantageous increase of the difference between the pressures of brake line 1 and constant-pressure air reservoir 4.

Furthermore, by suitably selecting the choke valves 30 and 31 and related parts to cause the pressure in constant-pressure reservoir 4 to drop abruptly with an appropriate time delay after the brake line pressure has abruptly dropped as a result of abrupt braking action, it is possible to cause the pressure difference between the upper and lower sides of main diaphragm 6 of control valve 5 to be large only during the initial period of the braking and, by widely opening the air supplying aperture of supply-discharge valve 8, to promote the initial supply of air to brake cylinder 2. This so-called inshot action is effective in promptly elevating the pressure in brake cylinder 2 to a predetermined value.

According to the present invention in another aspect thereof, as mentioned briefly hereinbefore, defective brake release is prevented.

In the known systems described hereinbefore with reference to FIGS. 1 and 2, the pressure within the constant-pressure air reservoir 4, after the pressure in the brake line 1 has been reduced and the brakes have been applied, is maintained substantially equal to the brake line pressure in the previous running state. Then, if for some reason the brake line pressure does not return to its original value, the diaphragm 12 of valve 11 will remain in its upwardly pressed position, whereby the communication path between the constant-pressure air reservoir 4 and brake line 1 will remain shut off. As a result, the difference in pressures in reservoir 4 and brake line 1 will be maintained, and the brake will not be fully released.

In actual practice, defective brake release of the above-described nature occurs at the time when the locomotive of the train is changed, and the pressure with which air is replenished in the brake line of the driver's cab of the second locomotive is lower than that previously in the brake line in the former locomotive. More specifically, the former locomotive is separated from the train of cars it has been drawing by uncoupling the brake line after the brakes of the cars in the train have been applied by carrying out reduction of brake line pressure. Next, another locomotive is coupled to the train, and the brake line coupling is reestablished, and the brake line pressure is thereafter raised to release the brakes of all cars in the train. If the resulting pressure thus set is lower than that of the former locomotive, the pressure difference between constant-pressure air reservoir 4 of each car and brake line 1 cannot be eliminated since the pressure in each reservoir 4 is being maintained at the higher pressure of the former locomotive.

In contrast, since the pressure within the constant-pressure air reservoir 4 drops abruptly by a specific amount in the initial braking period in the brake control system according to the invention, the diaphragm 12 within valve 11 can return to its lower position to reopen the path of communication between the reservoir 4 and brake line 1 provided that the difference between the brake line pressures of the former and second locomotives is less than the amount by which the pressure in the reservoir was initially caused to drop abruptly.

Deviations in the brake line pressure can occur not only when locomotives are changed but also with the same driver's cab. There are some instances in actual practice wherein malfunctioning of the pressure adjusting valve for setting the brake line pressure due to infiltration of dust, freezing of moisture, and other causes gives rise to a temporary excessive increase in the brake line pressure, whereby defective releasing of the brakes occurs in the same manner as described above. In such cases, also, the possibility of defective brake release can be remarkably decreased in the brake control system of the invention in which abrupt dropping of the pressure in the constant-pressure reservoir 4 is provided.

Furthermore, in the case wherein such malfunctioning of the pressure adjusting valve results in a great deviation in the pressure, or in the case wherein the constant-pressure air reservoir is charged with excessive pressure through error in carrying out a so-called kickoff operation (i.e., an operation which comprises, when increasing the brake line pressure, communicating the brake line for only a short time directly with the main air reservoir to transmit a high-pressure wave from the driver's cab to the rear cars), which is resorted to at the brake valve for the locomotive in order to effect positive brake release in a very long train, it is not possible in known brake control systems to return to normal the pressure in the constant-pressure air reservoir 4 in each car except by operating a release nozzle or ejector (i.e., a manually operated valve (not shown) for releasing pressurized air within the reservoir 4 to the atmosphere).

In the brake control system of this invention, however, it is possible for the driver, remaining seated in his seat, to lower the pressure in the reservoir 4 of each car to any extent by remote-control operation by repeating emergency braking and increasing of the brake line pressure.

As mentioned hereinbefore, when the brakes are being applied, the quick-action chamber 17 is at the same pressure as the brake line 1, and the diaphragm 27a of valve 27 is deflected upward, whereby the constant-pressure air reservoir 4 and the expansion air reservoir 29 are at the same pressure. However, when emergency braking is applied, and the brake line pressure becomes zero (gauge), the pressure in quick-action chamber 17 also decreases to atmospheric pressure. Consequently, diaphragm 27a returns to its original state as indicated in FIG. 3, and expansion air reservoir 29 is isolated from constant-pressure air reservoir 4 similarly as in the running state, the air therein being exhausted.

Then, when the brake line is resupplied with air, the brakes are not released, and expansion air reservoir 17 is in a state of communication with the brake line, until the pressure in the brake line reaches that in reservoir 4. Accordingly, the pressure acting on the lower surface of diaphragm 27a rises together with the rise in pressure in the brake line. Then, when this pressure reaches a certain value, diaphragm 27a is again deflected upward, and the path of communication between expansion air reservoir 29 which has been exhausted by the emergency braking and constant-pressure air reservoir 4 is again opened. As a result, the pressure in reservoir 4 is again lowered abruptly in one step.

By repeating emergency braking and increasing of the brake line pressure in this manner, the pressure in constant-pressure air reservoir 4 can be lowered to any extent. Therefore, defective brake release action due to excessive charging of this air reservoir 4 can be easily eliminated.

According to the present invention, in still another aspect thereof as mentioned briefly hereinbefore, there is provided a brake control system provided with means whereby emergency braking operation is prevented even during a rapid decrease in the brake line pressure due to abrupt braking action during the initial period of normal braking as described above.

In the state of the system as indicated in FIG. 3, brake line 1 and constant-pressure air reservoir 4 are at the same pressure, and supply-discharge valve 25 is in the air exhausting position. Consequently, quick-action chamber 17 is communicating with the atmosphere through shutoff valve 16, and diaphragm 15 of differential pressure valve 24 is being subjected on its upper surface to the brake line pressure and on its lower surface to atmospheric pressure and, therefore, is deflected to its lowermost position, whereby shutoff valve 16 is fully open.

Accordingly, when pressure release from brake line 1 is carried out for starting braking action, and the pressure reduction assumes a steady rate, the first action which occurs is a rising of diaphragm 12 of valve 11 to open supply-discharge valve 25, whereby the pressurized air in brake line 1 passes through valve 25 and also through shutoff valve 16, which is fully open, and enters quick-action chamber 17. An abrupt drop in the pressure in brake line 1 is thus accomplished to effect abrupt braking in the initial period of braking.

Until this abrupt braking action is completed, pressurized air from brake line 1 is not charged into quick-action chamber 17. Therefore, quick-action operation for transmission of emergency braking actuation is not carried out until the initial abrupt braking action is completed.

After the abrupt braking action, quick-action operation wherein the rate of pressure reduction in brake line 1 is detected, and brake line 1 is opened to the atmosphere when this rate is high, can be accomplished in exactly the same manner as described hereinbefore with respect to the system illustrated in FIG. 1.

As described above, the three-pressure brake control system according to the present invention is provided with a three-pressure type control valve operably by the difference in pressures in the brake line and a constant-pressure air reservoir and by the brake cylinder pressure and with a quick-action chamber for accomplishing abrupt braking action at the time of braking operation.

In this brake control system, the constant-pressure air reservoir and a second expansion air reservoir can be communicated by way of a valve which is operable by pressurized air flowing out of the quick-action chamber through a choke valve and opens and closes the communicative path. After partial reduction of the brake line pressure has been accomplished by the quick-action chamber, the pressure within the constant-pressure air reservoir can be reduced by a specific amount by the second expansion air reservoir. Furthermore, a differential pressure valve operable by the difference in the pressures in the brake line and the quick-action chamber is provided between an abrupt braking valve and the quick-action chamber. This differential pressure valve operates, during abrupt braking in the initial period of braking, to communicate with the quick-action chamber, which is at atmospheric pressure, and operates, after completion of abrupt braking, to compare the rates of decrease of the brake line pressure and the pressure in the quick-action chamber, releasing the pressurized air within the brake line in one action to the atmosphere when the former rate is higher than the latter rate.

Thus, irrespective of whether the braking operation is normal braking or whether it is emergency braking, when, after abrupt braking which propagates and transmits to the rear cars the condition of the initial period of braking, the rate of pressure decrease in the brake line is still exceeding a certain limit, this condition is judged as being emergency braking, and the brake line is opened to the atmosphere.

It is thus possible to cause the amount of pressure reduction due to abrupt braking to be of large magnitude to transmit a braking starting command in a prompt manner to the rearmost car in a train and to lower the pressure in the constant-pressure air reservoir below the initial pressure. Accordingly, it becomes possible to hole the brake cylinder pressure due to the three-pressure type control valve thereby to prevent excessive braking effect due to the abrupt braking action in the initial braking period.

A further feature of the system according to the invention is that any defective brake release due to causes such as deficient brake line pressure or excessive charging of the constant-pressure air reservoir can be easily eliminated by merely controlling the brake control handle.

We claim:

1. In a brake control system comprising:
   A. a three-pressure type control valve (5) operating in response to the difference between the pressures in a brake line (1) and a constant-pressure air reservoir (4) to control the supply of pressurized air from a pressurized air supply source (3) to the interior of at least one brake cylinder (2) and to control the exhausting of air from the interior of said at least one brake cylinder;
   B. a supply-discharge valve (25) operating in response to the difference between the pressures in said brake line (1) and said constant-pressure air reservoir (4) to permit the pressure in the brake line (1) to escape into a first expansion air reservoir and cause an abrupt drop in said pressure when reduction of the brake line pressure is carried out for braking operation, venting the air within said expansion air reservoir when said pressure within the brake line exceeds a predetermined pressure; and
   C. a quick-action device operating when the rate of reduction of the brake line pressure at the time of braking operation is greater than a predetermined value to cause an abrupt exhaustion in the brake line pressure, the combination therewith of a second expansion air reservoir (29), a path connecting said constant-pressure air reservoir (4) and said second expansion air reservoir (29), and a valve (27) operable by pressurized air from said first expansion air reservoir to open said path thereby to permit air within said constant-pressure air reservoir (4) to enter into said second expansion air reservoir (29).

2. A brake control system as claimed in claim 1 in which a choke valve (31) is provided in the communicative path connecting a quick-action chamber (17) constituting the first expansion air reservoir and the valve (27) operable by the pressurized air in the quick-action chamber.

3. A brake control system as claimed in claim 1 in which a choke valve (30) is provided in the communicative path connecting the constant-pressure air reservoir (4) and the second expansion air reservoir (29).

4. A brake control system as claimed in claim 1 in which the first expansion air reservoir (17) is communicably connected to the brake line (1) by way of a differential pressure valve (24) of said quick-action device operating in response to the difference between the pressures in the brake line and the first expansion air reservoir.